Sept. 30, 1930. W. J. AUSTIN 1,777,246
AUTOMOBILE BRAKE
Filed March 31, 1928
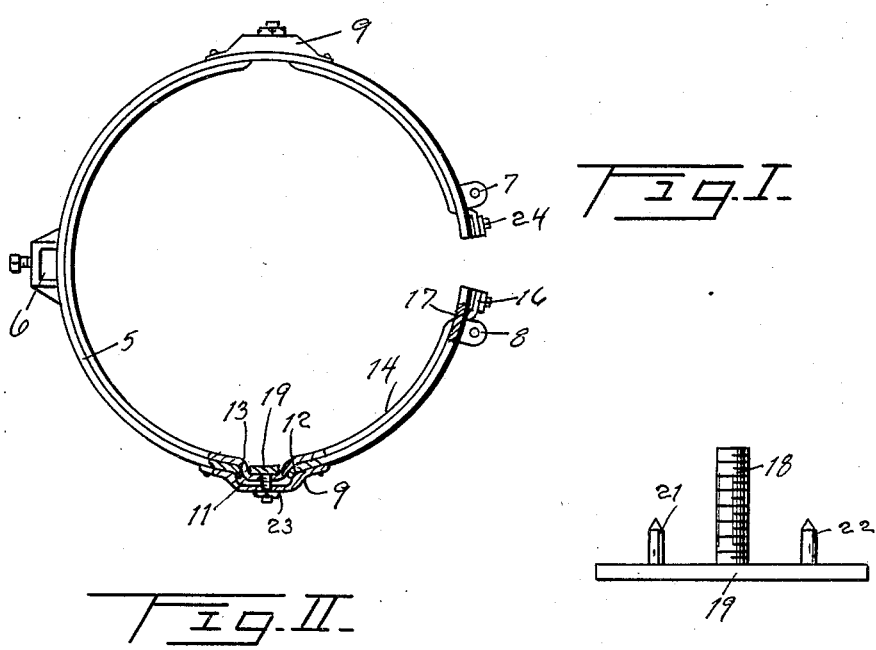
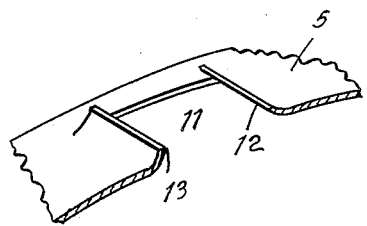
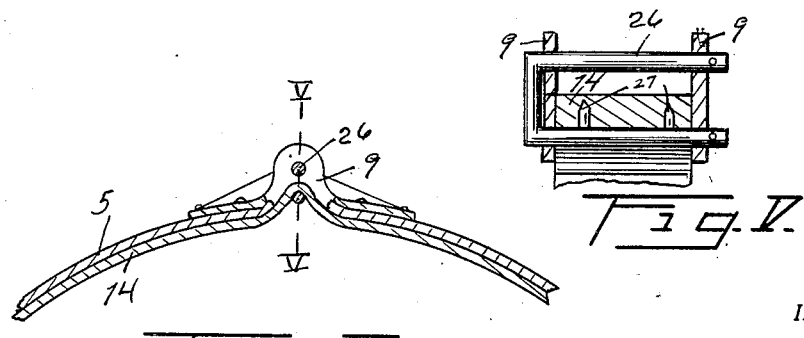
INVENTOR.
W. J. AUSTIN
BY Victor J Evans
ATTORNEYS.

Patented Sept. 30, 1930

1,777,246

UNITED STATES PATENT OFFICE

WILLIAM JOSEPH AUSTIN, OF SAN FRANCISCO, CALIFORNIA, ASSIGNOR OF ONE-HALF TO VICTOR DAHL AND E. L. ROSCOE, BOTH OF SAN FRANCISCO, CALIFORNIA

AUTOMOBILE BRAKE

Application filed March 31, 1928. Serial No. 266,298.

This invention relates to improvements in automobile brakes and has particular reference to means for applying a brake lining to a brake band without the use of rivets.

Another object is to provide means whereby the brake lining will be securely held to the brake band at points throughout its length and without weakening the structure of the brake lining.

A further object is to provide means whereby a brake lining may be quickly removed and replaced by an unskilled person.

A still further object is to provide means for securing the brake lining to the brake band in a manner which is economical.

Other objects and advantages will be apparent during the course of the following description.

In the accompanying drawing forming a part of this specification and in which like numerals are employed to designate like parts throughout the same, Figure 1 is a side elevation of a brake constructed in accordance with my invention and partly broken away in order to show a fastening means, Figure 2 is an enlarged detail side elevation of one of the fastening elements, Figure 3 is a fragmentary perspective view of the locking slot, Figure 4 is an enlarged detail fragmentary view of the modified form of locking means, and Figure 5 is an enlarged cross sectional view taken on the line 5—5 of Figure 4.

It has been common practise to secure brake linings to brake bands by first drilling a hole through the brake band and the brake lining after which the brake lining is counter-sunk to accommodate the head of the rivet. The rivets are then placed through the lining and through the band after which the rivet is set.

It requires an expert to properly apply a brake band in such a manner that it will not have high spots and further after the brake has been worn, the head of the rivets will eventually come into contact with the surface of the brake drum, which surface will become scored and consequently will have to be resurfaced at a considerable expense.

Applicant has threfore provided means for securing a brake lining to a brake band in such a manner that the brake lining will be securely held to the brake band but the objectionable rivets and the difficulty of inserting the same is removed.

In the accompanying drawings wherein for the purpose of illustration is shown a preferred embodiment of my invention, the numeral 5 designates a standard brake band commonly secured to an automobile as by a bracket 6 and contracted through the medium of ears 7 and 8, which are secured to the opposite ends of the brake band and are actuated by the brake mechanism of the vehicle. The construction thus described forms no part of my invention.

To this brake band I secure offset castings as shown at 9. These castings may be spaced about the band at any convenient points and serve to overlie an opening punched or otherwise formed through the brake band 5, which opening is shown at 11 in Figures 1 and 3. It will be noted that the portions of the band adjacent the slot 11 are turned up as shown at 12 and 13. At 14 I have shown a brake lining one end of which is secured by the clamps 16 carried upon the end of the band. This brake lining is then passed through an opening 17 thence along the surface of the band until one of the openings 11 is encountered. The lining is now slightly depressed into the opening 11 after which a fastening element as shown in Figure 2, is brought into engagement with the lining in such a manner that the stub 18 passes through the band and through the casting 9. This stub 18 carries a plate 19 having prongs 21 and 22 formed thereon. These prongs will pass through the brake lining and thus serve to further lock the lining to the band.

A nut 23 serves to pull the fastening elements into intimate engagement with the brake lining and further enables the operator to move the plate 19 to a point below the inner periphery of the brake lining. The lining is continued around the band being fastened at various points in the manner just described and finally having its end secured beneath a clamp 24 carried upon the opposite end of the band from the clamp 16.

In the modified form shown in Figure 4 the same numbers have been applied to indicate corresponding parts, the only difference being that instead of employing a fastening element as shown in Figure 2 a U-shaped bolt 26 is employed, one leg of which bolt carries prongs 27, which are adapted to enter the brake lining for the purpose of preventing creeping. The manner of employing the U-shaped bolt is clearly shown in Figures 4 and 5.

It will thus be seen that I have produced a brake which will accomplish all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In combination with a brake band having diametrically opposed spaced openings formed in said band, castings secured to said band and overlying the openings thereof, a brake lining contacting said band, fastening elements serving to draw portions of said brake lining through the openings of the band and adapted to retain the portions of said lining in a fixed position outwardly beyond the remainder of said lining, and means for securing the fastening elements to said casting.

In testimony whereof I affix my signature.

WILLIAM JOSEPH AUSTIN.